United States Patent [19]

Fulghum

[11] 3,994,376
[45] Nov. 30, 1976

[54] SELF ACTUATING MECHANISM FOR BRAKING A DRIVEN MEMBER UPON DISCONTINUATING OF DRIVE THERETO

[75] Inventor: David A. Fulghum, La Grange, Ill.

[73] Assignee: International Harvester Company, Chicago, Ill.

[22] Filed: Apr. 25, 1973

[21] Appl. No.: 354,623

[52] U.S. Cl. .............................. 192/8 R; 188/82.9; 56/11.3
[51] Int. Cl.² ........................................ F16D 67/00
[58] Field of Search ............... 192/8 R; 188/82.9; 56/11.3

[56] References Cited
UNITED STATES PATENTS

| | | | |
|---|---|---|---|
| 710,757 | 10/1902 | Coleman et al. | 188/82.9 |
| 2,834,443 | 5/1958 | Olchawa | 192/8 R |
| 3,174,596 | 3/1965 | Sisson | 192/8 R |
| 3,448,840 | 6/1969 | Rosin | 192/8 R |
| 3,536,169 | 10/1970 | Arnold | 192/8 R |
| 3,621,958 | 11/1971 | Klemm | 192/8 R |
| 3,656,320 | 4/1972 | Belansky | 192/8 R X |
| 3,722,642 | 3/1973 | Zurek et al. | 192/8 R |
| 3,731,472 | 5/1973 | Kamlukin | 192/16 X |

*Primary Examiner*—Benjamin W. Wyche
*Attorney, Agent, or Firm*—Dennis K. Sullivan; Floyd B. Harman

[57] ABSTRACT

A mechanism is provided which is adaptable for connection between a drive and a rotatable shaft having a cutting member thereon to provide a driving connection therebetween when mechanical power flows from the drive to the shaft, the mechanism being axially static at all times and being operable to produce a self-actuating braking force on the shaft when the power flow is interrupted to prevent extended freewheeling of the shaft.

7 Claims, 4 Drawing Figures

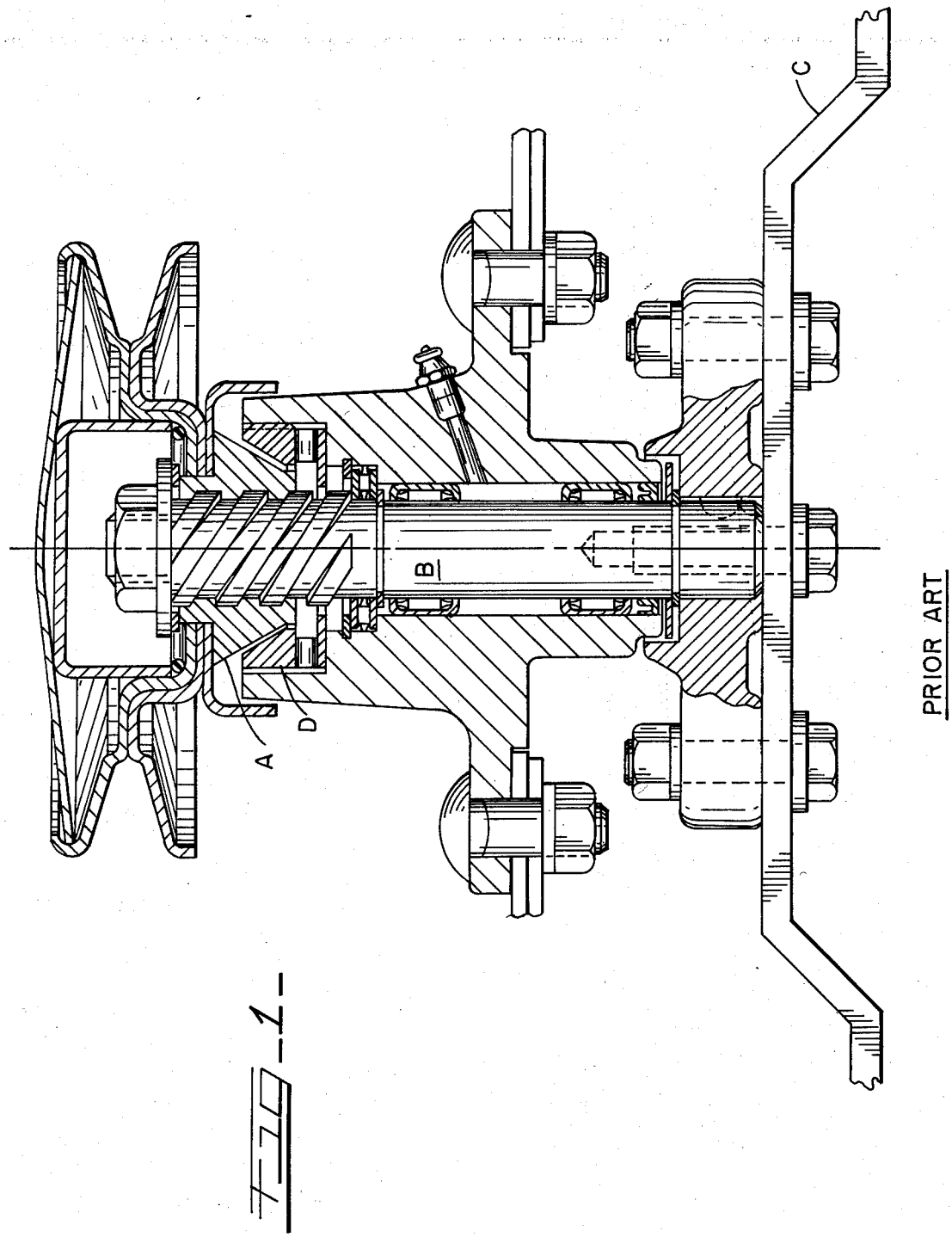
Fig. 1 — PRIOR ART

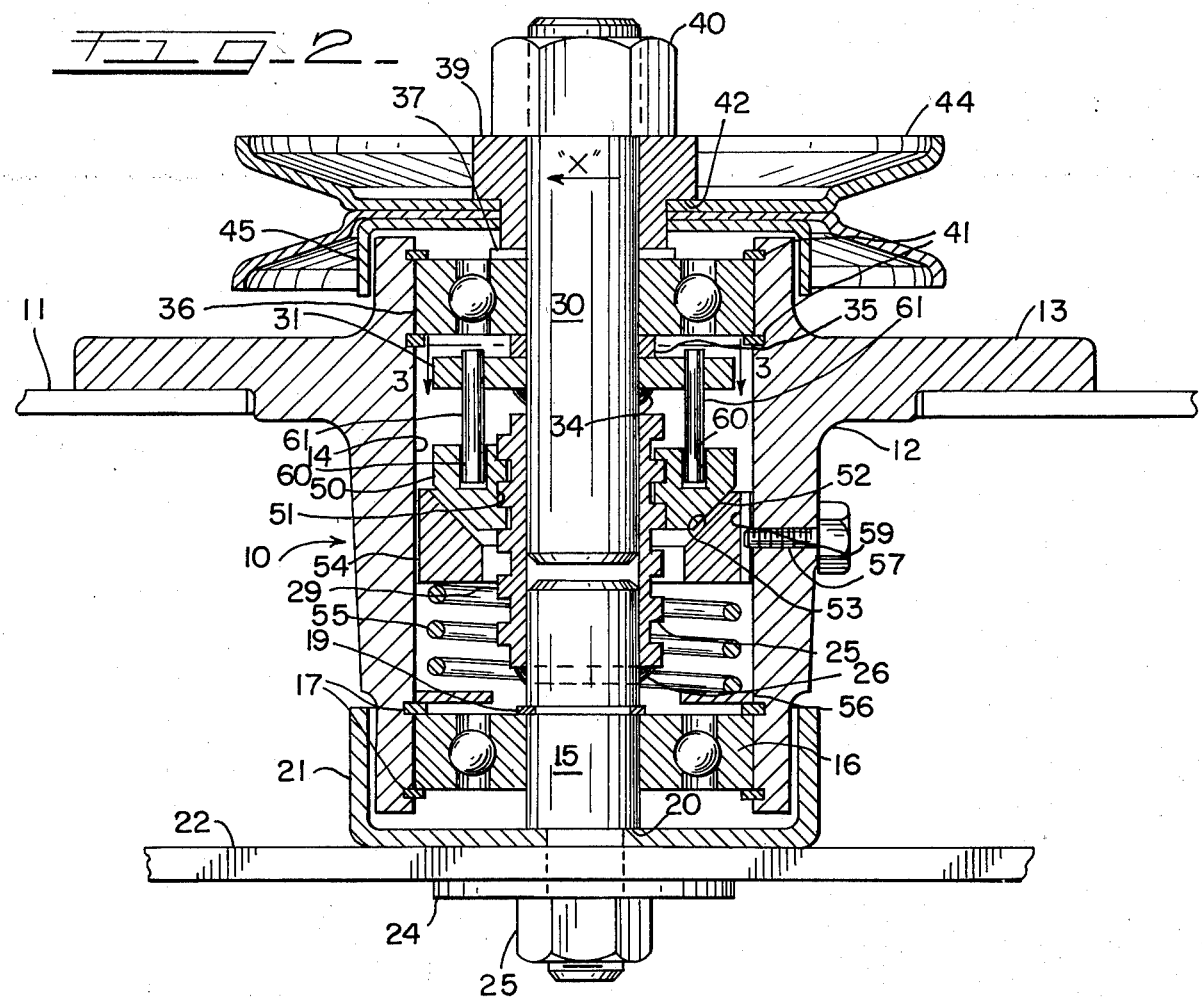
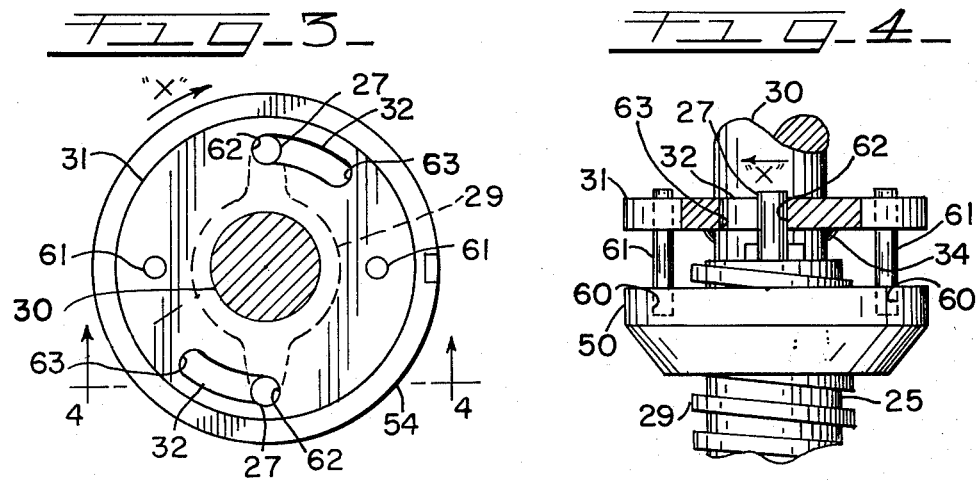

3,994,376

SELF ACTUATING MECHANISM FOR BRAKING A DRIVEN MEMBER UPON DISCONTINUATING OF DRIVE THERETO

CROSS REFERENCE TO RELATED APPLICATIONS

This application is related to application Ser. No. 133,641 filed Apr. 13, 1971, now U.S. Pat. 3,722,642, and application Ser. No. 296,462 filed Oct. 10, 1972, now U.S. Pat. No. 3,897,678 by James W. Zurek and David A. Fulghum and assigned to the assignee hereof.

BACKGROUND OF THE INVENTION

Often times it is desirable to provide braking mechanisms on rotating equipment to expend the kinetic energies stored in driven members and thereby prevent extended freewheeling of those members after a driving source has been disconnected. It is apparent that in certain situations, such as the driving of rotary cutters in lawnmowers, choppers or other forms of equipment having rotary members more or less accessible to an operator, that manually operable braking devices to stop such rotary members could be employed with an included disadvantage that the operator must continually remember to engage and disengage the brake during operation. Often such devices fall into disuse.

Others have provided overrunning clutches which do not provide a braking action on rotating members but rather produce an audible sound when the driving source is disconnected which may alert the operator that the rotary member is still in motion.

In the related applications, Ser. No. 133,641 and Ser. No. 296,462, self-actuating braking mechanism similar to that disclosed herein are provided. Specifically, these mechanisms, one of which is shown for reference in FIG. 1, comprise a drive member A having an input pulley attached thereto and having a lower braking surface thereon, which threadedly engages an output shaft B having a cutting member C and means for limiting the upward axial movement of the drive member A when it rotates on the threads of the shaft. The downward axial movement of the drive member on the shaft is limited by a nonrotary braking member D springingly supported in the shaft housing.

When power flows from the input pulley to rotate the cutting member, the drive member A rotates on the shaft B and moves axially upward until it contacts the limiting means on the shaft. At this point most of the driving force is transmitted through the threads of the shaft and drives the cutting member. When the power is interrupted, the momentum of the cutting member C causes the shaft to rotate in the drive member A moving it axially downward until its braking surface contacts the braking surface on the brake member D. At this point, a braking force is developed which is transmitted through the threads to the shaft and cutting member until they stop rotating.

While these mechanisms perform their intended functions, they also present some problems. First, the threads on the shaft are required to transmit most of the driving force transmitted through the mechanism and all of the braking force. This condition is conductive to excessive wear of the threads, especially if lubrication is neglected, which may lead not only to a condition rendering the braking action inoperative but possibly to total failure of the mechanism.

A second problem with these mechanisms is that the input pulley, being connected to the drive member A, moves up and down during starting and braking. Since the drive belt is usually in a transient condition during these times, its tension generally being increased or decreased to transmit or interrupt power to the cutting mechanism, the movement of the pulley may cause the belt to be thrown. Moreover, a buildup of debris beneath the pulley could prevent the braking mechanism from operating.

Accordingly, it is an object of the invention described herein to provide a self-actuating drive-brake mechanism wherein the driving force is transmitted from the input drive to the output drive and cutter substantially independently of the means used to shift the braking means to the braking position.

It is further an object of the invention to provide a connection between the input drive and the output shaft and cutter which is axially static during all conditions of operation.

Other objects and features of the present invention will become more fully apparent in view of the following detailed description taken in conjunction with the accompanying drawings illustrating a preferred embodiment of the inventive concepts hereinafter disclosed.

BRIEF DESCRIPTION OF THE DRAWINGS

FIG. 1 is a side elevational sectional view of a prior art self-actuating braking mchanism such as shown in the related applications;

FIG. 2 is a side elevational sectional view of a self-actuating braking mechanism incorporating the inventive concepts described herein;

FIG. 3 is a sectional view taken along the line 3—3 of FIG. 2 and illustrating the driving connection; and FIG. 4 is a sectional view taken along the line 4—4 of FIG. 3.

DESCRIPTION OF THE PREFERRED EMBODIMENT

Attention is first directed toward FIG. 2 and a preferred embodiment of the instant invention, namely a drive and self-actuating brake mechanism generally designated 10, mounted in typical operating position on a partially illustrated housing 11 of a rotary cutting machine, such as a mower.

The mechanism comprises a support sleeve 12 having an annular mounting flange 13 for mounting the sleeve 12 as by bolting to the housing 11. The support sleeve 12 has a central bore 14 in which a shaft 15 is journalled by lower bearing 16 held in place in the bore 14 by upper and lower snap rings 17, the bearing 16 being pressed onto the shaft 15 against a snap ring 19 thereon to restrain the shaft 15 from axial movement. The mechanism 10 is shown arranged in a vertical orientation for illustration purposes only. It is to be understood that the mechanism may be utilized in other positions than shown and references to an upper and lower disposition of parts is used merely for convenience in describing the structure.

The lower end of the shaft 15 protrudes from the sleeve 12 and terminates in a threaded section of a smaller diameter thereby forming a shoulder 20. A cup shaped dust seal 21, cutting member or mower blade 22, and washer 24 are clamped against the shoulder 20 by nut 25 threaded on the end of the shaft 15. It will be appreciated that other means might be used to establish a positive connection between the cutting member and the shaft 15 to prevent movement therebetween without departing from the scope of the invention. For example, FIG. 1 illustrates an alternative method of attaching the cutting member to the shaft.

The upper end of the shaft 15 is provided with an externally threaded sleeve 25, the end of the shaft 15 being inserted into the lower portion of the sleeve 25 and the two being attached to each other as by welding at 26. The upper portion of the sleeve 25 is provided with at least one and preferably a pair of diametrically disposed drive lugs 27 (FIGS. 3 and 4) which are displaced from the axis of the sleeve 25 a greater distance than the helical land or threads 29 thereon.

An upper shaft 30 extends into the upper portion of the sleeve 25, there being sufficient clearance therebetween to permit rotation of the shaft 30 relative to the sleeve 25. A drive member 31 comprising an annular plate having circumferentially disposed slots 32 therein to engage the drive lugs 27 on the sleeve 25, is affixed to the shaft 30, as by welding at 34, above the sleeve 25, the slots 32 being displaced from the axis of the shaft 30 an amount equal to the displacement of the drive lugs 27 therefrom to permit a limited degree of rotation between the drive member 31 and the sleeve 25.

A spacer 35, a bearing 36, a second spacer 37, and a drive hub 39 are mounted on the shaft 30 above the drive member 31 and are clamped thereagainst by a nut 40 threaded upon the upper portion of the shaft 30. The outer race of the bearing 36 is held in place in the central bore 14 by a pair of snap rings 41, thereby restraining the shaft 30 from axial movement. At the lower end of the drive hub 39, the diameter thereof is reduced to provide a shoulder surface 42 onto which a sheave or pulley 44 and dust shield 45 can be affixed to the hub 39 as by welding. It is apparent that other drive devices such as a sprocket or a coupling mechanism could be easily adapted to similarly drive the hub 39.

Thus, an axially static driving connection has been provided between the input drive means and the cutting member, power being transmitted from the pulley 44, hub 39, upper shaft 30, and drive member 31, which are all fixed relative to each other, to the drive lugs 27 on the threaded sleeve 25 (the slots 32 having been taken up) and thence to the shaft 15 and the cutting member 22 independently of the threads 29 on the threaded sleeve 25.

The self-actuating braking means comprises a braking member 50 having a bore with a spiral groove 51 which threadedly engages the helical land or threads 29 on the threaded sleeve 25. The lower end of the brake member 50 has a beveled or conical braking surface 52 which is angled to mate with a complemental braking surface 53 on a brake insert 54 located in the bore 14 and supported therein by a spring 55 having its lower end supported by a washer 56 resting on the upper snap ring 17. The brake insert 54 is held against rotary entrainment but permitted to move axially by a pin 57 affixed to support housing 12, as by being threaded therein, which engages a vertical groove 59 in the brake insert 54.

On its upper surface the brake member 50 has a pair of diametrically disposed holes 60 which slidingly receive a pair of pins 61, the other ends of the pins 61 being pressed into the drive member 31, the pins 61 being diametrically disposed thereon and circumferentially displaced from the slots 32.

During operation, when the shaft 30 and drive member 31 are rotated relative to the shaft 15 in a direction indicated by arrow X, the brake member 50 rides on the threads 29 and moves outwardly, that is upwardly, the pins 61 sliding axially in the holes 60, until the relative rotation of the shaft 30 and the shaft 15 is halted by the drive lugs 17 engaging the ends 62 of the slots 32 thereby disengaging the braking surfaces. Conversely, when the shaft 15 is rotated in the direction X, thereby producing relative rotation in the opposite direction from above, the brake member 50 will move in an axially inward or downward direction such that the braking surfaces 52 and 53 engage, the spring 55 being compressed, until the drive lugs 27 contact the opposite ends 63 of the slots 32 stopping the relative motion of the shaft 15 and the shaft 30.

It can be seen from the above that the relationship of the length of the slots 32 to the pitch of the threads 29 combined with the spring constant of the spring 55 will determine the amount of braking force to be applied. That is a longer slot 32, a greater pitch of the threads 29, or a larger spring constant of the spring 55 will increase the braking force developed. Needless to say, the slots 32 and the pitch of the threads 29 must be large enough to bring the braking surfaces into contact.

It can also be seen that the braking force developed between the braking member 50 and the brake insert 54 is transmitted by the pins 61 to the drive member 31 and thence through the driving connection between the slot 32 and the drive lugs 27 to the threaded sleeve 25, shaft 15, and cutting member 22. Thus, a means of transmitting the braking force independent of the threads 29 has been provided.

THE OPERATION OF THE PREFERRED EMBODIMENT

In the operation of the mechanism 10, when a driving torque is applied to the drive hub 39 in the direction indicated by X, as by a drive belt (not shown) attached to a suitable power source transmitting torque thereto through the pulley 44, the shaft 30 and drive member 31 rotate with respect to the shaft 15 and sleeve 25 until the drive lugs 27 contact the ends 62 of the slots 32. At this point the shaft 15 and the cutting member 22 begin to rotate at the same speed as the shaft 30. This relative rotation between the shaft 30 and the shaft 15 also causes the brake member 50 to move axially upwardly upon the threaded sleeve 25 to disengage the braking surfaces 52 and 53, the pin 61 retaining the brake member from rotation with respect to the shaft 15. As long as torque is continually provided to the mechanism through the pulley 44, the drive member 31 will remain in driving relation to the drive lugs 27 on threaded sleeve 25, and to the shaft 15 and cutting member 22.

When the driving torque applied to the shaft 30 through the pulley 44 is interrupted, as by the loosening of the drive belt, the momentum of the moving cutter element 22, which acts similar to a flywheel, supplies torque to the shaft 15, causing it to rotate relative to the shaft 30 and drive member 31, action such as wind resistance on the sheaves, friction from a loose belt thereon, and friction in the upper bearing 36 tending to produce a retarding torque on the upper shaft 30. The rotation of the shaft 15 relative to the drive member 31 (in the direction X) causes the drive lugs 27 to move in the slots 32 toward the opposite ends 63 thereof. This rotational movement causes the brake member 50 to move axially inwardly or downwardly toward the brake insert 54, the brake member 50 sliding downwardly on the pins 61. When the braking surfaces 52 and 53 engage, a braking torque is applied which increases the axial thrust of the brake member 50. The axial movement of the brake member 50 continues further increasing the brake torque as the spring 55 deflects until the drive lugs 27 reach the ends 63 of the slots 32. At this point the spring 55 and brake insert 54 impose a constant braking force on the brake member 50 which is transmitted through the pins 61 and drive member 31 to the lugs 27, sleeve 25, shaft 15, and cutting member 22 until the mechanism stops rotating.

It will be appreciated that a preferred embodiment of the invention has been chosen for the purposes of illustration and description herein based upon the requirements for achieving the objects of the invention and developing the utility thereof in the most desirable manner, due regard being had to existing factors of economy, simplicity of design and production methods, and the improvements sought to be effected. It will be understood that the particular structure and functional aspects emphasized herein are not intended to exclude but rather to suggest such other modifications and adaptations as fall within the spirit and scope of the appended claims.

What is claimed is:

1. For an implement having a cutting member, a mechanism for driving and braking said cutting member, said mechanism being automatically shiftable from a drive condition to a brake condition upon the discontinuance of power supplied thereto comprising:
   support means having a first springingly supported braking surface therein and held against rotary entrainment;
   input drive means journalled on said support means and rotatably drivable from a source of driving torque;
   output shaft means positively connected to said cutting member and journalled on said support means coaxially with said input drive means;
   means providing a relatively rotatable coupling between said input drive means and said output shaft means for transmitting forces therebetween, said coupling being rotatable within a range between a driving coupling at one end of said range when torque is supplied to said input drive means and a braking coupling at the other end of said range when said source is interrupted;
   a braking member having a second braking surface thereon disposed for engagement with said first braking surface, said braking member being axially slidably coupled with said input drive means and in continuous rotary entrainment therewith, said forces being transmitted by said coupling means between said input drive means and said output shaft means independently of said braking member; and
   shifting means coupling said braking member with said output shaft means, said shifting means being operative to move said braking member to a position disengaging said braking surfaces from contact when said output shaft means is in driven coupling with said input drive means and operative to shift said braking member to a position engaging said braking surfaces when said output shaft means is in braked coupling with said input drive means.

2. The invention according to claim 1 wherein said input drive means comprises a shaft having a drive member rotatably fixed thereto to engage said output shaft means, said drive member and said output shaft means being connected for relative rotation within a range by at least one drive lug in one of said members engaging a complementary slot in the other of said members.

3. The invention according to claim 2 wherein said brake member is axially slidably connected to said drive member by pins slidable in one of said members whereby said brake member may be axially displaced from said drive member while being held in rotary entrainment therewith.

4. The invention in accordance with claim 3 wherein said input drive means and said output shaft means are restrained from axial movement relative to each other.

5. The invention in accordance with claim 1 wherein said shifting means comprises interthreaded threads on said brake member and said output shaft means wherein rotation of said output shaft means in one direction effects axial displacement of said brake member thereon to engage said braking surfaces.

6. For an implement having a cutting member, a mechanism for driving and braking said cutting member, said mechanism being automatically shiftable from a driving condition to a braking condition upon interruption of driving power thereto, comprising:
   a support sleeve having a first nonrotatable braking surface therein;
   a power input shaft journalled in said support sleeve and adapted for driven connection to a source of power;
   a drive member mounted on said input shaft and constrained to rotate therewith;
   an output shaft having said cutting member positively affixed thereto journalled in said support sleeve coaxially with said input shaft, said output shaft operatively engaging said drive member and being rotatable relative thereto within a range between a driven coupling and a braked coupling with said drive member to shift said mechanism from a driving condition to a braking condition;
   a brake member interthreadedly coupled with said output shaft for axial displacement thereon upon rotation of said output shaft with respect to said drive member, said brake member having a second braking surface disposed for engagement with said first braking surface,
   axially slidable coupling means interconnecting said brake member and said drive member to permit relative axial movement therebetween while maintaining said brake and drive members in rotary entrainment,
   wherein upon the interruption of said driving power to said input shaft, said cutting member drives said output shaft causing it to rotate relative to said drive member thereby shifting said mechanism to said braking condition.

7. The invention in accordance with claim 6 wherein said output shaft engages said drive member by means of at least one drive lug attached to one of said shaft and said drive member engaging an end of a complementary slot in the other of said shaft and said drive member.

* * * * *